United States Patent
Barrus et al.

(10) Patent No.: US 7,382,227 B2
(45) Date of Patent: ***Jun. 3, 2008

(54) PORTABLE COMPUTER SUPPORTING PAGING INSTRUCTIONS

(75) Inventors: Jeff Barrus, Emmet, ID (US); Dean A. Klein, Eagle, ID (US); Shane Thomas, Eagle, ID (US)

(73) Assignee: Micron Technology, Inc., Boise, ID (US)

( * ) Notice: Subject to any disclaimer, the term of this patent is extended or adjusted under 35 U.S.C. 154(b) by 314 days.

This patent is subject to a terminal disclaimer.

(21) Appl. No.: 10/742,619

(22) Filed: Dec. 18, 2003

(65) Prior Publication Data

US 2004/0160308 A1   Aug. 19, 2004

Related U.S. Application Data (63) Continuation of application No. 10/349,516, filed on Jan. 21, 2003, now Pat. No. 6,683,528, which is a continuation of application No. 09/098,937, filed on Jun. 17, 1998, now Pat. No. 6,518,874, and a continuation of application No. 09/098,935, filed on Jun. 17, 1998, now Pat. No. 6,522,242.

(51) Int. Cl.
*G08B 5/22* (2006.01)
*G08B 13/14* (2006.01)
*H04Q 1/30* (2006.01)
*H04Q 7/00* (2006.01)

(52) U.S. Cl. ..................... 340/7.1; 340/7.4; 340/568.1; 340/825.31

(58) Field of Classification Search .......... 340/7.1–7.4, 340/568.1, 571, 426.17, 825.44, 825.31, 340/539, 825.52, 5.2, 686.6, 328, 7.51, 5.25; 379/93.06; 710/101; 713/200; 709/246, 709/224, 250; 726/16–18, 29, 35, 36
See application file for complete search history.

(56) References Cited

U.S. PATENT DOCUMENTS

| | | | |
|---|---|---|---|
| 4,639,726 A | | 1/1987 | Ichikawa et al. |
| 5,073,767 A | | 12/1991 | Holmes et al. |
| 5,252,964 A | * | 10/1993 | Tan et al. ..................... 340/7.4 |
| 5,285,496 A | | 2/1994 | Frank et al. |
| 5,307,059 A | * | 4/1994 | Connary et al. ........... 340/7.62 |

(Continued)

OTHER PUBLICATIONS

Notice of Allowance, dated Oct. 1, 2002, for U.S. Appl. No. 09/098,935.

(Continued)

*Primary Examiner*—Brian Zimmerman
*Assistant Examiner*—Nam Nguyen
(74) *Attorney, Agent, or Firm*—Knobbe, Martens, Olson & Bear LLP (57) ABSTRACT

A portable computer is described that contains a circuit for receiving pages and performing security functions based on the received page. Once a page has been received by the portable computer, the computer's hard drive can be automatically reformatted, or the portable computer can be prevented from booting. In addition, the portable computer can be programmed to use a modem to automatically dial a security center and transmit security information such as the Caller ID Tag of the current telephone number.

36 Claims, 4 Drawing Sheets

U.S. PATENT DOCUMENTS

| | | | |
|---|---|---|---|
| 5,414,418 A * | 5/1995 | Andros, Jr. | 340/7.4 |
| 5,446,678 A | 8/1995 | Saltzstein et al. | |
| 5,497,464 A | 3/1996 | Yeh | |
| 5,510,778 A | 4/1996 | Krieter et al. | |
| 5,550,861 A | 8/1996 | Chan et al. | |
| 5,611,055 A | 3/1997 | Krishan et al. | |
| 5,619,396 A | 4/1997 | Gee et al. | |
| 5,636,342 A | 6/1997 | Jeffries | |
| 5,640,153 A | 6/1997 | Hildebrand et al. | |
| 5,646,839 A | 7/1997 | Katz | |
| 5,684,382 A | 11/1997 | Fritz et al. | |
| 5,748,084 A * | 5/1998 | Isikoff | 340/568.1 |
| 5,873,040 A | 2/1999 | Dunn et al. | |
| 5,887,131 A * | 3/1999 | Angelo | 726/20 |
| 5,887,145 A | 3/1999 | Harari et al. | |
| 6,011,473 A | 1/2000 | Klein | |
| 6,031,894 A | 2/2000 | Fleming, III | |
| 6,052,782 A | 4/2000 | Fleming, III | |
| 6,518,874 B2 | 2/2003 | Barrus et al. | |
| 6,522,242 B1 | 2/2003 | Barrus et al. | |

OTHER PUBLICATIONS

Interview Summary, dated Sep. 3, 2002, for U.S. Appl. No. 09/098,935.
Response to Office Action, filed Sep. 3, 2002, for U.S. Appl. No. 09/098,935.
Notice of Appeal, filed Apr. 4, 2002, for U.S. Appl. No. 09/098,935.
Response to Office Action, filed Apr. 5, 2002, for U.S. Appl. No. 09/098,935.
Final Office Action, dated Nov. 5, 2001, for U.S. Appl. No. 09/098,935.
Response to Office Action, filed Aug. 20, 2001, for U.S. Appl. No. 09/098,935.
Non-Final Office Action, dated Mar. 20, 2001, for U.S. Appl. No. 09/098,935.
Response to Office Action, filed Jan. 12, 2001, for U.S. Appl. No. 09/098,935.
Final Office Action, dated Sep. 12, 2000, for U.S. Appl. No. 09/098,935.
Response to Office Action, filed Sep. 19, 2000, for U.S. Appl. No. 09/098935.
Non-Final Office Action, dated Jan. 18, 2000, for U.S. Appl. No. 09/098,935.
Notice of Allowance, dated Oct. 1, 2002, for U.S. Appl. No. 09/098,937.
Response to Office Action, filed Aug. 29, 2002, for U.S. Appl. No. 09/098,937.
Advisory Action, dated Jul. 31, 2002, for U.S. Appl. No. 09/098,937.
Interview Summary, dated Jul. 18, 2002, for U.S. Appl. No. 09/098,937.
Response to Office Action, filed Jul. 17, 2002, for U.S. Appl. No. 09/098,937.
Advisory Action, dated May 2, 2002, for U.S. Appl. No. 09/098,937.
Notice of Appeal, filed Apr. 2, 2002, for U.S. Appl. No. 09/098,937.
Response to Office Action, filed Apr. 2, 2002, for U.S. Appl. No. 09/098,937.
Final Office Action, dated Oct. 2, 2001, for U.S. Appl. No. 09/098,937.
Notice of Appeal, filed Mar. 8, 2001, for U.S. Appl. No. 09/098,937.
Final Office Action, dated Sep. 8, 2000, for U.S. Appl. No. 09/098,937.
Response to Office Action, filed Jun. 19, 2000, for U.S. Appl. No. 09/098,937.
Response to Office Action, dated Apr. 21, 2000, for U.S. Appl. No. 09/098,937.
Notice of Allowance, dated Oct. 21, 2003, for U.S. Appl. No. 10/349,516.
Interview Summary, Interview dated Sep. 10, 2003, for U.S. Appl. No. 10/349,516.
Notice of Allowance, dated Oct. 1, 2003, for U.S. Appl. No. 10/349,516.

* cited by examiner

PORTABLE COMPUTER SUPPORTING PAGING INSTRUCTIONS

RELATED APPLICATIONS

This application is a continuation of, and incorporates by reference in their entireties, U.S. patent application Ser. No. 10/349,516 entitled "PORTABLE COMPUTER SUPPORTING PAGING FUNCTIONS," filed on Jan. 21, 2003, now U.S. Pat. No. 6,683,528, which is a continuation of Ser. No. 09/098,937, now U.S. Pat. No. 6,518,874, issued on Feb. 11, 2003 entitled "PORTABLE COMPUTER SUPPORTING PAGING FUNCTIONS" and Ser. No. 09/098,935, now U.S. Pat. No. 6,522,242, issued on Feb. 18, 2003 entitled "METHOD FOR INFORMATION RECEPTION IN A PORTABLE COMPUTER," both of which were filed on Jun. 17, 1998.

FIELD OF THE INVENTION

This invention relates to portable computer systems. Specifically, this invention relates to portable computer systems having integrated circuits for receiving and processing paging messages.

BACKGROUND OF THE INVENTION

Over the past several years, personal communication devices such as pagers and cellular telephones have become widely used in both business and personal environments. Fast and reliable communication has made it much easier for people to travel from their home or office without becoming unavailable to co-workers or others. The advent of portable computers has also encouraged this trend, as many people perform a large amount of their duties using computing devices, and the portable or "laptop" computer further enhances the ability of people to remain productive while traveling.

More recently, pagers have been introduced into the market with increased data handling capabilities. As one example, the PageWriter™ 2000 manufactured by Motorola is a two-way pager with a keyboard and graphical display which sends Internet e-mail and has automated message handling capability. In addition, computing devices have been enhanced with additional communication capabilities. U.S. Pat. No. 5,550,861 to Chan et al. for example, describes a PCMCIA format card for laptop computing applications which includes an onboard modem and pager unit.

Despite these trends in combining communication and data processing capabilities, little progress has been made in taking advantage of the available benefits of the combined implementation of such devices. The current state of the art consists essentially of conventional communication functions coupled to conventional data processing functions, thereby producing one device which may combine previously available features but which does nothing to provide additional functionality. In addition, advantageous hardware implementations of such combinations have not been explored.

SUMMARY OF THE INVENTION

The invention comprises a portable computer which includes a wireless receiver. The wireless receiver may be adapted for receiving pages. In some embodiments, the portable computer includes a page interpreter coupled to the page receiver so as to translate selected page messages into commands to be executed by the portable computer.

Another embodiment of the invention comprises a computing device which includes a microprocessor, a microcontroller coupled to the microprocessor; and a wireless receiver coupled to the microcontroller. The computing device may further include a battery, coupled to the microcontroller and the wireless receiver such that the microcontroller and the wireless receiver are operative to receive and store messages when the microprocessor is in an off state.

Messages received via a page receiving circuit may in some embodiments of the invention be classified into two groups. A volatile memory circuit may store messages of a first group, and a non-volatile memory may store information concerning message content for messages of a second group. Messages of the second group may comprise commands to the portable computer.

DETAILED DESCRIPTION OF THE INVENTION

The invention will now be described with reference to the accompanying Figures, wherein like numerals refer to like elements throughout. It may initially be noted that the terminology used in the description presented herein is intended to be interpreted in its broadest reasonable manner, even though it is being utilized in conjunction with a detailed description of certain specific embodiments of the invention.

Embodiments of the invention include portable computers having integrated pager circuitry for receiving messages through a wireless communication network. Although a wireless receiver is a generic circuit provided in any type of wireless communication device including radios, cellular telephones, televisions, etc., a pager is a specific type of wireless communication device which is adapted to receive (and sometimes transmit) numerical or alpha-numerical data over a dedicated pager frequency band, such as 940-941 MHz for example. As used herein, the term "pager" refers to any wireless receiver with the capability to receive transmissions of numerical or alpha-numerical data over a dedicated paging system, whether public or private, and which may be implemented in whole or in part through the public telephone network, satellite systems, base stations, etc. In the embodiments described below, a wireless receiver which may advantageously comprise a pager unit is integrated into a portable computer so that numerical or alpha-numerical codes can be sent to the portable computer for further processing by the portable computer.

Figure 1:
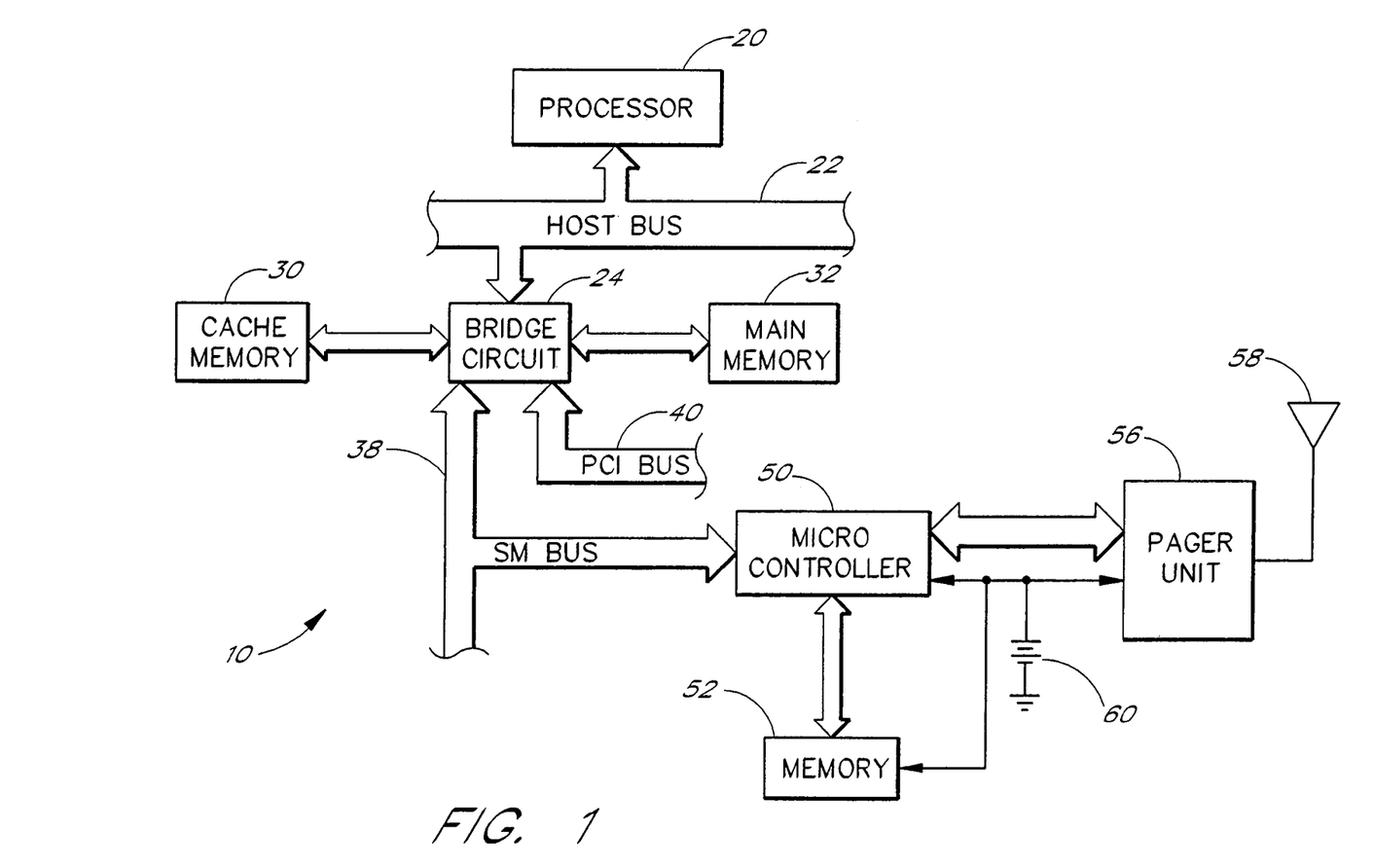
FIG. 1 is a block diagram illustrating a portable computer system including a processor, bridge chipset, microcontroller and pager unit.

Referring now to FIG. 1, a portable computer 10 includes a processor 20 in communication with a host bus 22. The processor 20 may be any conventional microprocessor such as an Intel Pentium, Intel Pentium II, Digital Equipment Corporation Alpha or Motorola microprocessor. The host bus 22 communicates data between the processor 20 and a bridge circuit 24. The bridge circuit 24 can include one or more discreet components that provide data communication between the processor 20 and other components within the personal computer 10. Bridge circuits 24 incorporating the functionality shown in FIG. 1 are known in the art, and are commercially available from, for example, Intel Corp., as the 430TX chipset. The bridge circuit 24 is linked to a cache memory system 30 and a main memory system 32. The cache memory system 30 provides conventional cache functions for buffering data reads and writes to the main memory system 32.

In addition, the bridge circuit 24 is linked to a system management bus (SMBUS) 38 and a peripheral component interconnect (PCI) bus 40. In conventional computers, the PCI bus transfers data between peripheral devices and the bridge chip set 24. The SMBUS 38 provides control signals for managing several high-level functions within the portable computer 10. For example, the SMBUS 38 may communicate signals indicative of the remaining battery power in the portable computer from a battery to the processor 20. In addition, the SMBUS 38 might provide signals relating to power management features within the portable computers such as screen blanking, hard disk powering, and other features that allow a portable computer to extend its battery life. Most commercially available laptop computers include a standard format system management bus, and further description of its structure and communication protocol is not required to understand the present invention.

In one embodiment of the invention, the system management bus 38 is linked to a microcontroller 50. The microcontroller can be any conventional microcontroller available from several commercial sources. One suitable commercially available microcontroller is the model 68HC11 from Motorola Corporation. The microcontroller 50 can store and retrieve data from a memory 52. The memory 52 can be any type of data storage device including Dynamic Random Access Memory (DRAM), Static Random Access Memory (SRAM), Erasable Programmable Read Only Memory (EPROM) or Electrically Erasable Programmable Read Only Memory (EEPROM). As will be explained more fully below, the memory advantageously comprises a battery powered SRAM portion and a EEPROM portion. Furthermore, although illustrated in FIG. 1 as separate components, some or all of the memory 52 may be incorporated into the microcontroller 50. The Motorola 68HC11 mentioned above, for example, includes internal EEPROM. In one embodiment, the memory 52 stores security codes that, when received by the microcontroller 50, will be translated into a signal on the SMBUS 38.

As shown in FIG. 1, the microcontroller 50 communicates with a pager unit 56 having a receiving antenna 58. The pager unit 56 itself may comprise a conventional wireless receiver circuit with the ability to receive numeric or alphanumeric data and transmit that data to the microcontroller 50. These circuits are well known to those of skill in the art, and are not described further herein.

The pager unit 56, microcontroller 50, and memory 52 may all be connected to a dedicated battery supply 60, which is advantageously separate from the battery which powers the remainder of the portable computer. With a separate battery supply 60, not only can pages be received and processed when the portable computer 10 is turned off, but pages can be received and processed even if the battery pack provided to power the portable computer as a whole is removed entirely. This feature is significant with reference to several security functions implemented as described in more detail below.

When the portable computer is paged, the pager unit answers the page, receives the message contained in the page, and sends this message to the microcontroller 50. The microcontroller 50 stores the message in the memory 52. Due to the presence of the battery backup 60, this process can be performed while the computer is off, or even when the main battery pack for the computer is removed. If several pages are received when the computer is off, the messages will continue to queue in the memory 52 until the microprocessor is available to retrieve and process them.

It is one advantageous aspect of the invention that the messages received by the pager and acted upon by the portable computer may be classified into two distinct groups. A first group of messages comprises information sent to the portable computer for viewing by the portable computer user. This class of page corresponds to many conventional paging alphanumeric messages which include telephone numbers to return phone calls to, short textual messages from the paging party, etc. This class of page also corresponds to existing "global" pages, including stock or weather reports, or other information which is broadcast to large number of subscribers at approximately the same time. A second group of messages comprise commands which instruct the computer to perform a function specified in the page. As will be explained below, advantageous functions performed in response to pages include security functions which may be initiated by the portable computer user with a page if the computer has been stolen.

Figure 2:
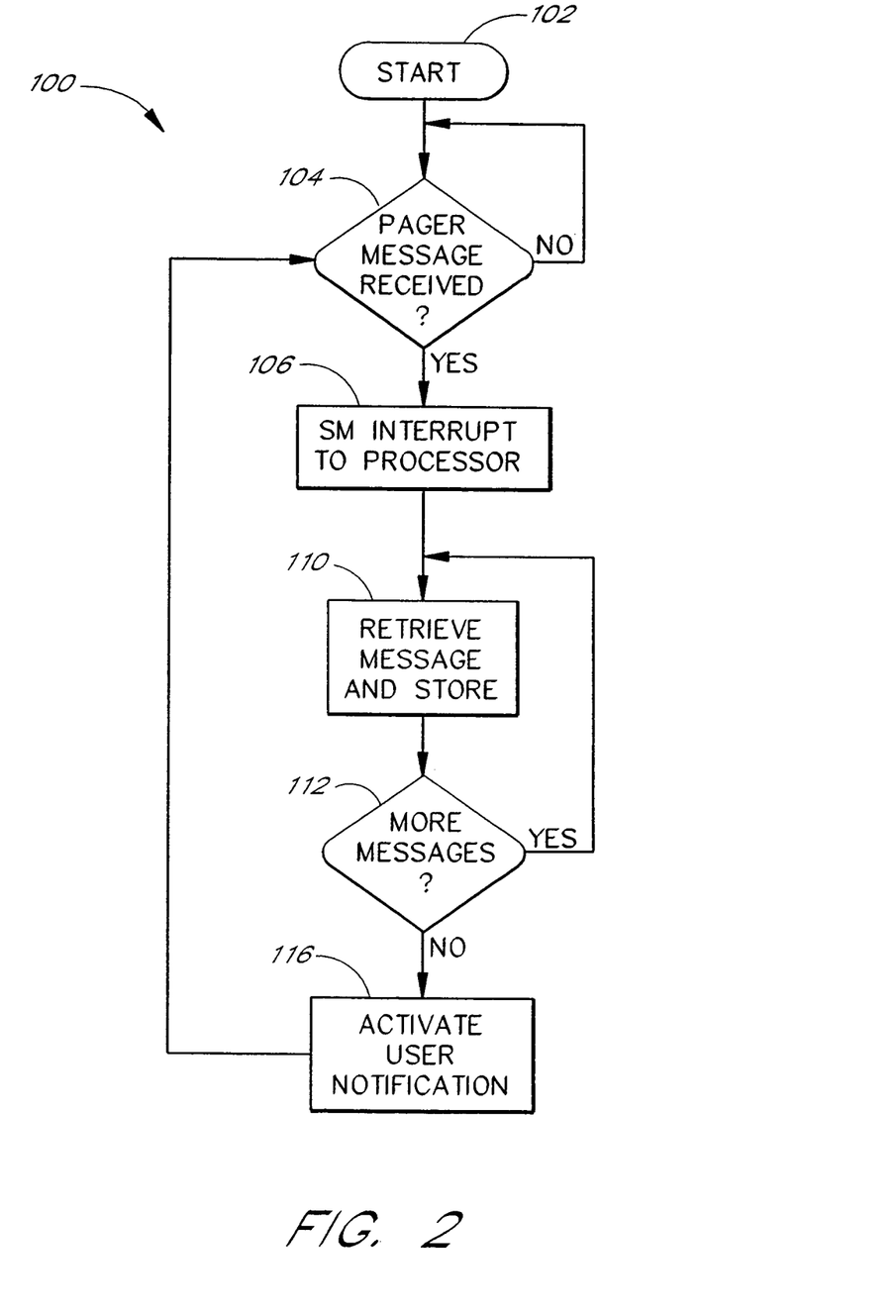
FIG. 2 is a flow diagram illustrating the process of receiving a page and activating a user notification.

Referring now to FIG. 2, a specific embodiment of a process 100 of servicing pager messages is described. The process illustrated in FIG. 2 is especially adapted to the reception and processing of pager messages of the first group described above, although it will be appreciated by those of skill in the art that many of the steps performed will be the same for page processing of messages of both groups. The process 100 begins at a start state 102 and then moves to a decision state 104 to determine whether a page message has been received by the portable computer 10. When implemented with the hardware of FIG. 1, this step may be accomplished by periodically evaluating one or more status flags in the microcontroller 50 which are set if page message information which has not previously been forwarded to the microprocessor is resident in the memory 52. If a page message has not been received, the process 100 continues looping at the decision state 104 until a message is received. If a message has been received, the process 100 moves to a state 106 wherein the microcontroller 50 forwards an interrupt on the SMBUS 38 to the processor 20. The SMBUS interrupt indicates to the processor 20 that the microcontroller 50 has data that needs to be retrieved, and causes the microprocessor to perform a page service subroutine.

The processor 20 then services the request made by the pager microcontroller 50. The process 100 moves to a state 110 wherein the message received by the pager unit 56 and stored in the memory 52 is retrieved by the processor 20 and stored on, for example, the hard disk drive of the portable computer. A determination is then made at a decision state 112 whether additional messages have been stored in the memory 52 which have not been retrieved by the processor 20.

If a determination is made that more messages have been received, they are retrieved and stored at the state 110 as before. However, if more messages have not been received the process 100 moves to a state 116 wherein the user is notified that one or more pages have been received. The pages may be displayed and read with a simple text editor program or other user application software. It should be noted, however, that in some embodiments the user may not be notified of the page. For example, some types of security programs may be designed to bypass the user notification.

Once a user notification has been activated at the state 116, the process 100 returns to the decision state 104 and waits for additional page messages to be received. It will be appreciated by those of skill in the art that many different hardware and software implementations of the above described procedure are possible. One alternative implementation may involve a memory resident page servicing program which automatically retrieves queued messages received since the computer was last powered up, and when the computer is on, periodically polls the microcontroller for additional page messages.

As mentioned above, it is one aspect of the invention that the portable computer not only receives and displays standard personal and global pages for the computer user, but may also evaluate the content of the page so as to interpret the page as a command to perform a particular function. Computer activity based on page content has not been performed prior to the present invention. Thus, a portable computer in accordance with the present invention may include not just page reception and display circuitry, but may additionally include a page content interpreter.

One advantageous application of this feature of the invention increases the security of portable computing platforms. This provides a substantial improvement over existing laptop computers as some of the advantages of portable computers, such as their small size and light weight are also disadvantages in that they can be easily stolen. Increases in laptop security is one example of enhanced functionality provided by a computer/pager in accordance with the invention.

Figure 3:
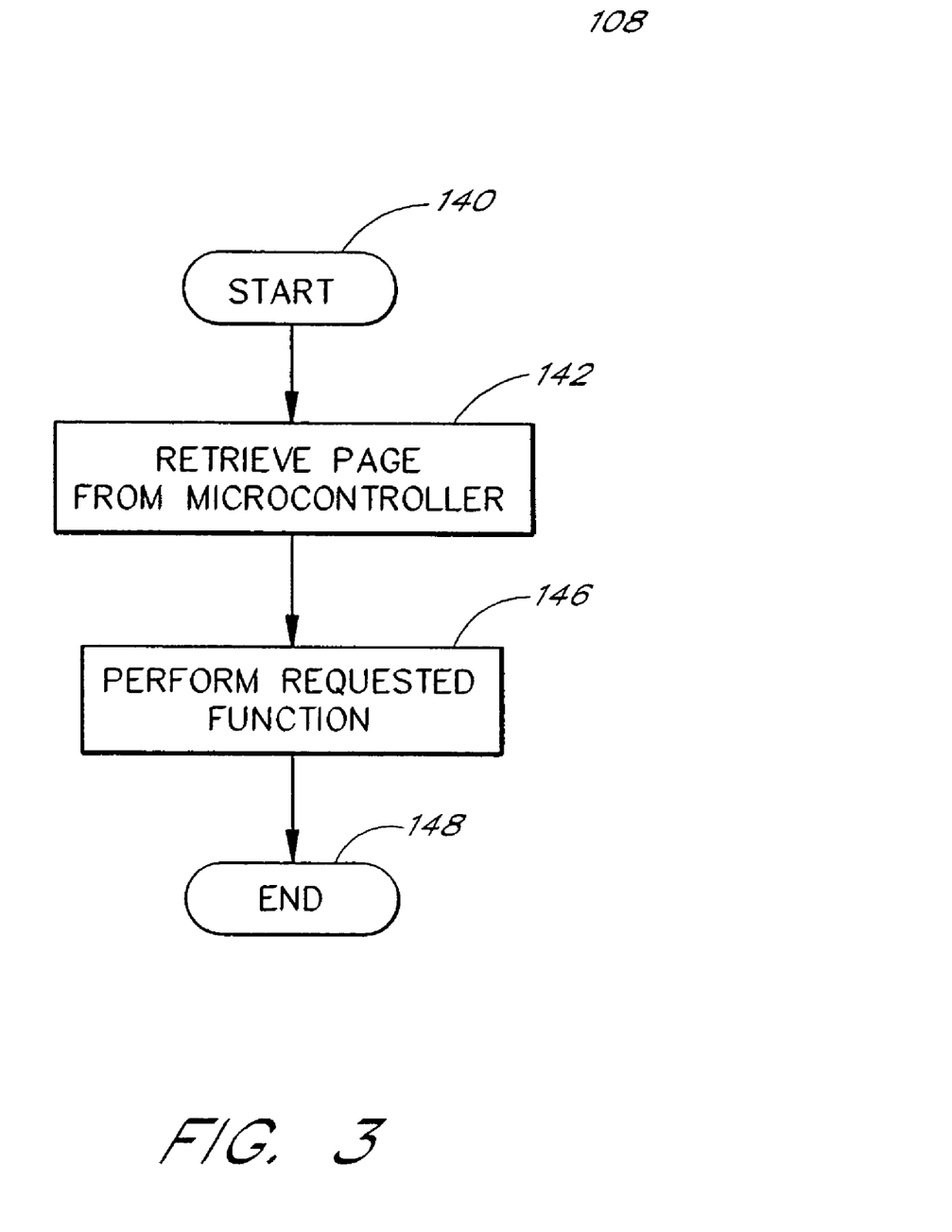
FIG. 3 is a flow diagram illustrating the process of receiving a pager command and performing a security function.

Specific implementations of processes by which the computer performs functions in response to pages are explained with reference to FIGS. 3 and 4 below. Advantageously, some of these functions may be related to computer security. Referring now to FIG. 3, a general page implemented computer command procedure is described. This process begins at a start state 140 and moves to a state 142 wherein the processor 20 retrieves a page from the microcontroller 50. In contrast to the procedure described in conjunction with FIG. 2, however, the content of the page retrieved in this case is not merely a message for the portable computer user, but is actually a command to be performed by the portable computer. Thus, in conjunction with retrieving and storing received pages, the page servicing routing performed by the processor 20 may search the alphanumeric contents of the received pages for particular strings of characters, wherein selected strings are respectively associated with selected commands to be performed by the processor 20. If a match is found, the process then moves to a state 146 wherein the processor performs the function requested by the page. The process then terminates at an end state 148.

Although it will be appreciated that a wide variety of commands may be issued to the computer in this way, some specific advantageous commands include commands to perform security functions in the event the portable computer is stolen. In one embodiment, the received page can initiate an audible alarm from the internal speaker. In other embodiments, the owner can send a numerical page to the portable computer, which, when received, runs a more complicated security program. For example, the portable computer may, in response to a given page code, reset or reformat the hard disk drive, check the hard disk drive geometry, and/or write a selected pattern to all sectors of the hard disk drive. This may eliminate not only sensitive data from the hard disk drive, but also application programs of interest to computer thieves, resulting in a decrease in value of such a portable computer to a potential thief.

Computer tracking with page codes is also possible for portable computers with a modem. In this embodiment, the portable computer may be commanded via a page to run a security program which periodically determines if a telephone line is linked to the computer's telephone modem. If a telephone line is detected, the security program might instruct the telephone modem to turn off the speaker and silently dial a predetermined phone number of a computer at a security company or other secure location. Once the portable computer is connected to the computer at the security company, information can be sent related to the location of the portable computer. For example, in one embodiment, the portable computer may contain instructions for sending the owner's name, address and the Caller ID tag of the phone line being used to make the call to the security center. Thus, security personnel at the security center will know the name of the real owner of the portable computer and the telephone number of the location at which the computer is currently located.

Either as a standalone security feature, or in conjunction with the above functions, a predetermined numerical page code issued to the portable computer may additionally cause the portable computer to disable the boot process so that the computer may not be re-started. The locked computer is therefore useless to the thief. Reactivation of the computer may be implemented by sending a second page to the computer with an alphanumeric code which removes boot limitation set by the first page. In this embodiment, the BIOS may, when booting the computer at power up, retrieve one or more status bits from the memory 52 to determine whether or not the boot sequence should be halted or modified. These status bits are in turn set when an appropriate page code is received by the portable computer. In some advantageous embodiments, the microcontroller 50 is programmed to search received pages for selected alphanumeric sequences, and in response thereto, to set or clear the above mentioned status bits accordingly. The memory 52 may include some EEPROM memory to store these status bits so that they will not be erased even if the computer battery pack and the additional pager/microcontroller battery 60 are removed. It can thus be appreciated that in some embodiments of the invention, at least some page interpretation and processing, in addition to the function of storing page messages for later retrieval, may be done by the microcontroller 50, rather than only by the microprocessor 20. The portable computer may advantageously include a page receiver setup program which allows the user to choose the codes that either the microcontroller 50 and/or microprocessor 20 will interpret as selected security commands. Access to this program may itself be password protected, to inhibit thieves or other unauthorized users from reprogramming these security codes.

Figure 4:
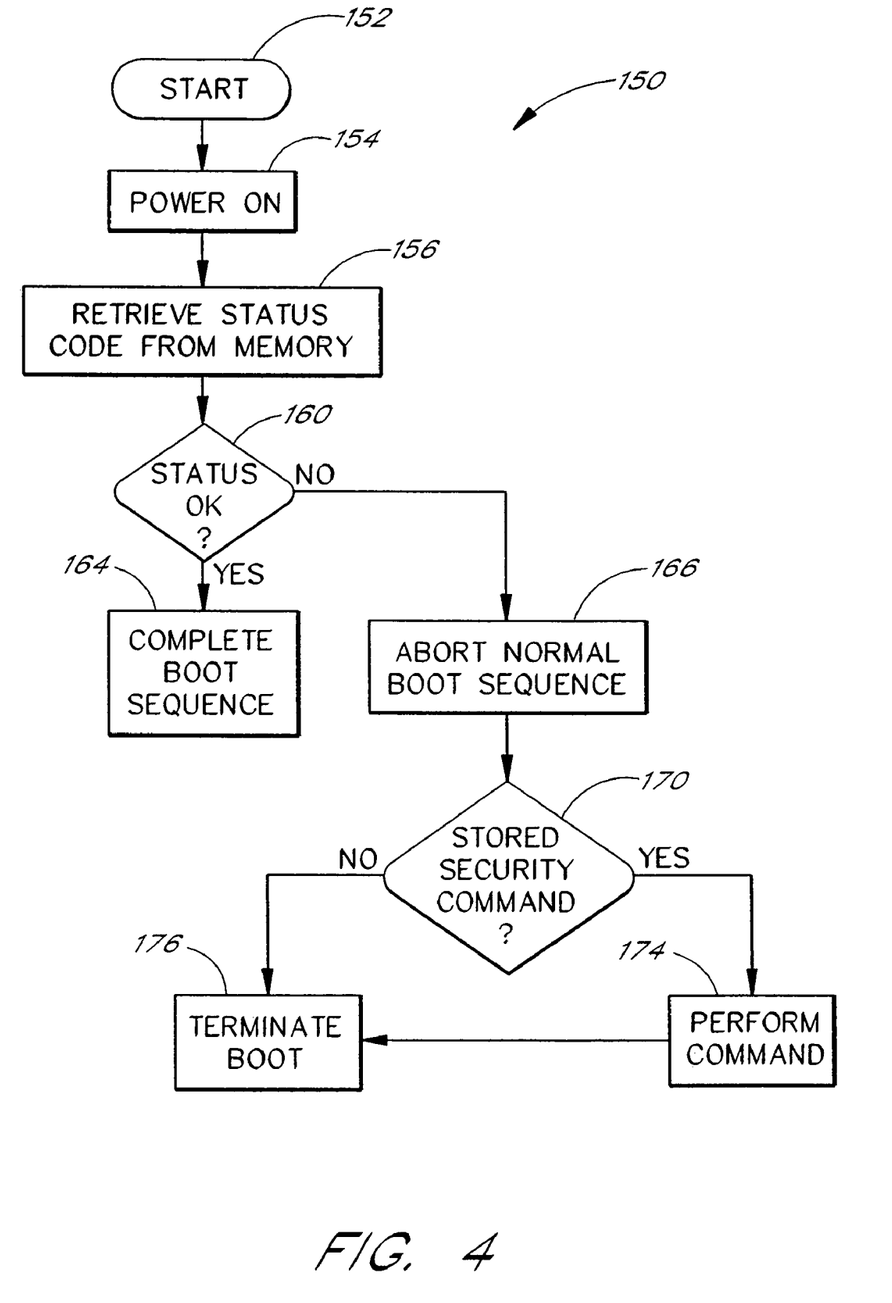
FIG. 4 is a flow diagram of a process of locking a computer once a security code has been received.

A specific example of a BIOS boot sequence in accordance with this implementation of the invention is provided in FIG. 4. Referring now to this Figure, a boot process 150 begins at a start state 152 and then moves to a state 154 when the portable computer 10 is turned on. The process 150 then moves to a state 156 wherein the computer BIOS retrieves a status code from the microcontroller 50. As discussed above, this status code may comprise a security code which has been set to a particular configuration and stored in the memory 52 in response to a prior page sent to the portable computer by the user. As is known in the art, the Basic Input/Output System (BIOS) is firmware that controls a computer's bootup sequence. The BIOS is normally stored in a programmable read only memory such an EPROM or EEPROM. Thus, the BIOS can be programmed at the factory to search for a particular security flag during every boot. Once the BIOS has read a security code from the microcontroller or its associated memory, the process 150 moves to a decision state 160 to determine whether the status of the computer is okay. Thus, if the computer has received a numerical or alpha-numerical page instructing the computer to no longer boot, the microcontroller 50 asserts a flag instructing the BIOS to bypass the bootup sequence. Thus, at the decision state 160, a determination is made whether such a lockup page code has been received.

If the status is okay at the decision state 160, the process 150 completes the boot sequence at a state 164. However, if the status is not okay, indicating that a security page has been received, the process 150 aborts the normal boot sequence at a state 166 and then proceeds to a decision state 170 to determine whether an additional security command has been stored in the memory 52. The additional command, for instance, might be to instruct a telephone modem within the portable computer 10 to dial a predetermined telephone number and transmit the Caller ID tag of the phone where the portable computer is located. As one alternative example, the additional command may instruct the portable computer to reformat the hard disk drive.

If a determination is made at the decision state 170 that a stored security command should be performed, the process 150 moves to a state 174 wherein the command is performed. However, if a determination is made at the decision state 170 that an additional security command has not been stored by the user via page the boot process of the portable computer 10 is terminated at a state 176. Once a security command has been performed at a state 174 (if required), the process of booting is also terminated at the state 176. Thus, if the portable computer has received a predetermined code that is associated with the microcontroller 50 preventing the portable computer 10 from booting, the portable computer will continue to terminate its boot sequence at the state 176. It can be appreciated that if the computer is later recovered, an additional, different code can be sent to the pager unit 56 to instruct the microcontroller 50 to clear the status code set with the prior page to indicate that the status of the computer at the decision state 160 is now okay. Thus, the computer will no longer be prevented from booting. Defeating the above described security system is very difficult for a computer thief. Without knowledge of the page security codes programmed in by the user, the thief cannot clear any set security flags. Furthermore, the dedicated battery supply 60 prevents the thief from blocking the reception of a security page by removing the computer battery pack.

The following scenario describes one type of security function which may be performed by embodiments of the portable computer. The owner of a portable computer may send a pager code to the portable computer after realizing that it has been stolen. To send a page, the owner dials a telephone number corresponding to the pager unit 56, and enters in the predetermined security code such as "99999." The code "99999" may instruct the computer to terminate any future boot sequence and re-format the hard disk drive to prevent access to any sensitive data present there.

In a few moments, the pager unit 56 receives the code "99999" and transfers that code to the microcontroller 50. If the portable computer is turned off, the battery 60 continues providing power to the pager 56, microcontroller 50 and memory 52 so that pages may be received and processed.

As can be appreciated from the discussion presented above, the page "99999" may be processed by the portable computer in a variety of ways. For example, the microcontroller 50 firmware may initially evaluate the content of the page to determine if the "99999" code corresponds to a particular pre-determined function or comprises simply a typical alphanumeric message for the computer user. If the microcontroller firmware identifies the code "99999" as being a security code, it may set one or more EEPROM status bits that are later evaluated by the BIOS of the portable computer so as to instruct the microprocessor 20 to exit the normal boot sequence and initiate a low-level format of the hard drive. Alternatively, the microcontroller 50 may not be programmed to evaluate the content of the pages received, and may simply store the "99999" in memory 52 for later retrieval and interpretation by the microprocessor 20.

If the portable computer is powered up at the time this page code "99999" is received, the microcontroller 50 may forward this code to the processor as part of the usual page processing program. The received page codes nay be evaluated by the processor 20 to check for codes such as the "99999" and, when received, cause the processor 20 to begin reformatting the hard drive.

It can be appreciated that many types of functions may be performed by the microcontroller 50 and/or the microprocessor 20 once a page has been received. The microcontroller 50 or an associated memory could store hundreds of codes, with each code being associated with a particular function to be carried out once the page is received.

While the invention has been described in connection with specific embodiments thereof, it will be understood that it is capable of further modification, and this application is intended to cover any variations, uses, or adaptations of the invention following, in general, the principles of the invention and including such departures from the present invention as would be understood to those in the art as equivalent and the scope and context of the present invention is to be interpreted as including such equivalents and construed in accordance with the claims appended hereto.

What is claimed is:

1. A computing device having a security function, the device comprising:

a wireless receiver; and computer instructions operative to cause the device to perform the following:

respond to the entry of a correct password by allowing an end-user to associate a code with one or more security function commands, wherein the association between a code and one or more security function commands is reprogrammable and customizable by the end-user;

receive information via the wireless receiver;

set a resettable status flag in a memory of the device if the information is security information:

determine the state of the resettable status flag during a boot sequence;

terminate the boot sequence if the state of the resettable status flag indicates security information;

determine whether the security information corresponds to the code; and if the security information corresponds to the code, execute the one or more security function commands after terminating the boot sequence.

2. The computing device of claim 1, wherein the device comprises a portable computing device.

3. The computing device of claim 2, wherein the computing device comprises a portable computer.

4. The computing device of claim 1, wherein the wireless receiver comprises a page receiver.

5. The computing device of claim 4, wherein the device is configured to receive a page message.

6. The computing device of claim 1, wherein the device is configured to execute a security function command comprising altering existing data stored on the memory of the device.

7. The computing device of claim 6, wherein the device is configured to execute a security function command comprising activating an audible alarm.

8. The computing device of claim 6, wherein the device is configured to execute a security function command comprising sending the Caller ID tag of a phone line connected to the device.

9. An apparatus having a security function, the apparatus comprising:
   a security setup program in the apparatus configured to respond to the entry of a correct password by allowing an end-user to associate a code with one or more security function commands, wherein the code is reprogrammable and customizable by the end-user;
   means for receiving information from a remote device;
   a memory for storing a resettable status flag, wherein the resettable status flag is set if the information received via the receiving means is security information; and
   a microprocessor configured to determine the state of the resettable status flag during a boot sequence, the microprocessor further configured to terminate the boot sequence if the state of the resettable status flag indicates security information, the microprocessor further configured to determine whether the security information comprises the code, and the microprocessor further configured to perform the security function commands after terminating the boot sequence if the security information comprises the code.

10. The apparatus of claim 9, wherein the setup program is configured to allow an end-user to customize the code more than one time.

11. The apparatus of claim 9, wherein the apparatus comprises a portable computing device.

12. The apparatus of claim 11, wherein the apparatus comprises a portable computer.

13. The apparatus of claim 9, wherein the end-user customizes the code using at least one of a keyboard, keypad, stylus, or pointer device.

14. The apparatus of claim 9, wherein the microprocessor is configured to perform a security function command comprising altering data stored in the memory of the device.

15. The apparatus of claim 9, wherein the microprocessor is configured to perform a security function command comprising activating an audible alarm.

16. The apparatus of claim 9, wherein the microprocessor is configured to perform a security function command comprising altering the performance of a subsequent boot sequence of the device.

17. The apparatus of claim 16, wherein altering the performance of a subsequent boot sequence comprises terminating the boot sequence if the code indicates that the device is lost or stolen.

18. The apparatus of claim 9, further comprising a modem, wherein the microprocessor is configured to perform a security function command comprising instructing the modem to dial a predetermined telephone number and transmit a caller ID tag of a phone line to which the modem is connected.

19. A device comprising:
   a configuration module in the device configured to respond to the entry of a correct password by allowing an end-user to establish one or more security codes, wherein each of the one or more security codes is associated with at least one of a plurality of security functions, and wherein the association between a security code and a security function is reprogrammable and customizable by the end-user; and
   a microcontroller configured to:
      receive information from a remote device;
      set a resettable status flag in a memory of the device if the information is security information;
      determine the state of the resettable status flag during a boot sequence;
      terminate the boot sequence if the state of the resettable status flag indicates the security information;
      determine whether the security information is representative of at least one of the security codes; and
      execute at least one of the security functions if the security information is representative of at least one of the security codes after terminating the boot sequence.

20. The computing device of claim 19, wherein the microcontroller causes the device to execute the at least one of said security codes.

21. The computing device of claim 19, wherein the security codes are stored in a non-volatile memory readable by the device.

22. The computing device of claim 19, wherein the information representative of at least one of said security codes is received via a wireless communication link.

23. The computing device of claim 19, wherein the information representative of at least one of said security codes is received via a paging device coupled to the device.

24. The computing device of claim 19, wherein the at least one of said security codes, when executed, causes data on at least a portion of an existing memory of the device to be altered.

25. The computing device of claim 24, wherein the existing memory comprises a hard drive.

26. The computing device of claim 19, wherein the at least one of said security codes, when executed, causes an audible alarm to activate.

27. The computing device of claim 19, wherein the at least one of said security codes, when executed, causes the sending of a Caller ID tag of a phone line connected to the device.

28. A device comprising:
   a wireless receiver configured to receive a code from a remote device, wherein said received code indicates whether status information stored at the device should be set to abort normal boot sequence operations; and
   a security setup program in the device configured to:
      respond to the entry of a correct password by allowing an end-user to associate a code with one or more customized boot sequence operations;
      set a resettable status flag when the received code indicates that status information stored at the device should be set to abort normal boot sequence operations;
      during a boot sequence, determine whether the resettable status flag is set to abort the normal boot sequence operations;

terminate the normal boot sequence operations if the resettable status flag is set to abort the normal boot sequence operations;

determine if one or more customized boot sequence operations are stored at the device; and if one or more customized boot sequence operations are stored at the device, execute at least one of the customized boot sequence operations after terminating the normal boot sequence operations.

29. The device of claim 28, wherein the state of the status information indicates a customized order for execution of a plurality of boot sequence operations.

30. The device of claim 28, wherein the status information indicates that the device should execute a predefined series of boot sequence operations.

31. The device of claim 28, wherein the status information comprises a plurality of alpha-numeric characters.

32. The device of claim 28, wherein the status information comprises a flag bit.

33. A method comprising:

storing in a device one or more security codes, wherein each of the one or more security codes is associated with at least one of a plurality of security functions and the one or more security codes are established by an end user, wherein the associations between the one or more security codes and the at least one of a plurality of security functions are reprogrammable and customizable by the end-user;

receiving information at the device;

setting a resettable status flap if the information is security information;

determining the state of the resettable status flap during a boot process;

terminating the boot process if the state of the resettable status flag indicates security information;

determining whether the security information is representative of at least one of the security codes; and initiating the at least one of the plurality of security functions associated with the security code if the security code is represented in the received information after terminating the boot process.

34. The method of claim 33, wherein the device comprises a wireless receiver and the information is received at the wireless receiver of the device.

35. The method of claim 33, wherein the device does not indicate to a user that the information representative of at least one of the security codes has been received.

36. The method of claim 33, wherein the device automatically initiates the at least one of the plurality of security functions associated with the security code represented in the received information.

* * * * *

UNITED STATES PATENT AND TRADEMARK OFFICE
CERTIFICATE OF CORRECTION

PATENT NO. : 7,382,227 B2
APPLICATION NO. : 10/742619
DATED : June 3, 2008
INVENTOR(S) : Barrus et al.

It is certified that error appears in the above-identified patent and that said Letters Patent is hereby corrected as shown below:

In column 8, line 58, in Claim 1, delete ":" and insert -- ; --, therefor.

In column 10, line 2, in Claim 18, delete "caller ID" and insert -- Caller ID --, therefor.

In column 12, line 2, in Claim 33, delete "flap" and insert -- flag --, therefor.

In column 12, line 4, in Claim 33, delete "flap" and insert -- flag --, therefor.

Signed and Sealed this

Twelfth Day of August, 2008

JON W. DUDAS
*Director of the United States Patent and Trademark Office*